United States Patent
Ebina et al.

[11] Patent Number: 5,083,684
[45] Date of Patent: Jan. 28, 1992

[54] INJECTION-MOLDED LID FOR AN AEROSOL CONTAINER

[75] Inventors: Yoichi Ebina, Osaka; Yoshimasa Ikeda; Masakazu Nakai, both of Shizuoka, all of Japan

[73] Assignee: Polyplastics Co., Ltd., Osaka, Japan

[21] Appl. No.: 545,067

[22] Filed: Jun. 29, 1990

[30] Foreign Application Priority Data

Jun. 30, 1989 [JP] Japan ................................ 1-168742

[51] Int. Cl.$^5$ .............................................. B65D 83/00
[52] U.S. Cl. .................................. 222/394; 222/402.1
[58] Field of Search .............................. 222/394, 402.1

[56] References Cited

U.S. PATENT DOCUMENTS

| | | | |
|---|---|---|---|
| 3,333,743 | 8/1967 | Meyers | 222/402.1 |
| 4,261,473 | 4/1981 | Yamada et al. | 215/1 C |
| 4,762,254 | 8/1988 | Nitta | 222/402.1 X |

FOREIGN PATENT DOCUMENTS

| | | |
|---|---|---|
| 0186413 | 7/1986 | European Pat. Off. |
| 2814952 | 10/1978 | Fed. Rep. of Germany |
| 2498119 | 1/1981 | France |
| WO89/05773 | 6/1989 | PCT Int'l Appl. |
| 2037378 | 7/1980 | United Kingdom ............ 222/402.1 |

OTHER PUBLICATIONS

*Plastic Mold Engineering Handbook*, edited by DuBois and Pribble, "Gating Systems", pp. 399–402, copyright 1978.

*Injection Molding Handbook*, edited by Rosato, P.E. and Rosato, Ph.D., "Gates", pp. 183–186, copyright 1986.

*Primary Examiner*—Michael S. Huppert
*Assistant Examiner*—Anthoula Pomrening
*Attorney, Agent, or Firm*—Nixon & Vanderhye

[57] ABSTRACT

An aerosol container includes a cylindrical container body having an open end, a lid injection-molded from a thermoplastic resin material and sealingly coupled to the container body and defining a mouth opening, and a metal dispensing cap sealingly coupled to the lid and closing the mouth opening. The dispensing cap is provided with a dispensing nozzle for dispensing the contents of the container in aerosol form. The lid itself includes an upper annular mounting bead sealingly coupled to the dispensing cap and having an interior upper surface (that establishes the mouth opening), and an interior lower surface that is radially outwardly disposed relative to the interior upper surface thereof. Important to the present invention, the lid includes at least three gates circumferentially equally spaced-apart relative to one another along the interior lower surface of the mounting bead. Preferably, the lid includes radial recessed slots formed in the interior lower surface of the mounting bead, wherein the gates are located within respective ones of the slots.

7 Claims, 3 Drawing Sheets

INJECTION-MOLDED LID FOR AN AEROSOL CONTAINER

CROSS-REFERENCE TO PRIORITY APPLICATION

This application is based for purposes of priority under 35 USC §119 upon Japanese Patent Application No. 1/168742 filed on June 30, 1989, the entire content of which is hereby expressly incorporated hereinto by reference.

FIELD OF INVENTION

The present invention generally relates to containers for containing and dispensing pressurized aerosols. More particularly, the present invention relates to aerosol containers having a generally tubular resin body closed at its lower end and open at is upper end, with an especially adapted molded resin lid and dispensing cap assembly closing the open upper end of the container body.

BACKGROUND AND SUMMARY OF THE INVENTION

Containers for pressurized aerosols have traditionally been fabricated from metal sheet due to the need for the container body to withstand the pressures of the aerosol contents. In this regard, accompanying FIG. 1 shows a typical prior art aerosol container C1 which includes a generally tubular metal container body B having its upper edge curled to form a circumferential mounting bead MB that establishes a relatively large mouth opening MO at the body's upper end. The mouth MO is closed with a metal cap C which includes an aerosol dispensing nozzle N of a conventional variety for dispensing the aerosol contents from the container C1. The metal cap C includes a circumferential mounting flange MF that is crimped onto the mounting bead MB of the container body B so as to provide a fluid-tight closure of the mouth opening MO.

Recently, however, resin aerosol containers have be produced by blow-molding techniques. In this regard, please see Japanese Laid-Open Application No. 125470/1978. However, it is difficult to produce containers having uniform thicknesses by conventional blow-molding techniques resulting in poor resistance to the pressure of the container's contents. In addition, the dimensional inaccuracies of the mounting bead at the upper edge of the container body result from blow-molding techniques resulting in inadequate fluid-seals between the dispensing cap and the container body.

In order to overcome the problems associated with the blow-molded aerosol containers, it has been proposed in Japanese Laid-Open Application No. 93482/1986 to form aerosol containers using injection molding techniques. An example of such an injection-molded container is represented container C2 in accompanying FIG. 2. As is seen, this conventional container C2 includes a container body B' formed of a suitable resin material. A lid L, also formed of a suitable resin material, is rigidly attached, for example, via ultrasonic welding techniques, to the upper edge E of the container body B' so as to form a fluid-tight seal therebetween. The upper end of the lid L is formed with a circumferential mounting bead MB'. The metallic dispensing cap C may then be coupled to the lid L by crimping its circumferential mounting flange MF' to the mounting bead MB' so as to close the open end of body B'.

However, it has been found that when containers of the type shown in FIG. 2 are allowed to stand for prolonged periods of time with pressurized contents, the contents occasionally leak therefrom because insufficient seals are formed between the crimped mounting flange MF' of metallic cap C and the mounting bead MB' and/or between the lid L and the upper edge E of the container body B'.

In this regard, it has been found that the radially narrowed mouth MO' defined by the interior surface of the lid L requires that the injection molding gate G be positioned on the mounting bead MB' (see FIG. 3) in order to prevent forced removal of the molded lid L from the mold when it is fabricated. As a result, a burr is usually formed when the solidified residue R associated with the injection molding gate G is removed from the mounting bead MB' thereby increasing the likelihood that an insufficient fluid-tight seal will be established between the mounting flange MF' of cap C and the mounting bead MB'. In addition, removal of such a burr requires that the lid L be subjected to an after-treatment so as to smooth the burr in an attempt to obviate the sealing problems noted above. Of course, such an after-treatment necessarily increases the cost of fabricating the lid L.

One further disadvantage of the resin lid L shown in accompanying FIG. 2 is that, in order to minimize the occurrence of burrs (and also minimize the costs associated with smoothing after-treatments), only a single injection gate is employed during the injection molding operation. However, the dimensional inaccuracies of such a single-gated injection molded lid L usually ensue thereby resulting in improper and/or incomplete fluid seals when the lid L is coupled to the container body B'.

What has been needed in this art, therefore, is an injection molded resin lid of high dimensional accuracy which does not need smoothing after-treatments. It is towards supplying such a need that the present invention is directed.

The present invention is directed to aerosol containers fabricated from injection-moldable resins, whereby the containers include a generally tubular body, ah injection-molded resin lid attached to an upper end of the container body and having a relatively thickened circumferential bead defining an open mouth, and an aerosol dispensing cap sealingly fixed to the bead of the lid and closing the defined open mouth thereof. Broadly, the present invention is especially characterized by providing at least three injection molding gates at a lower interior surface region of the mounting bead, whereby the molding gates are circumferentially spaced-apart from one another at substantially equal intervals.

Further aspects and advantages of the present invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

As mentioned briefly above, the present invention is characterized in an especially adapted injection-molded lid for aerosol containers whereby at least three equally circumferentially spaced-apart gates are employed during the injection molding process. Moreover, each of these gates that are employed are located physically on a lower interior surface region of the mounting bead associated with the lid as will be discussed in greater detail below in connection with accompanying FIGS. 4 and 5.

Figure 1:
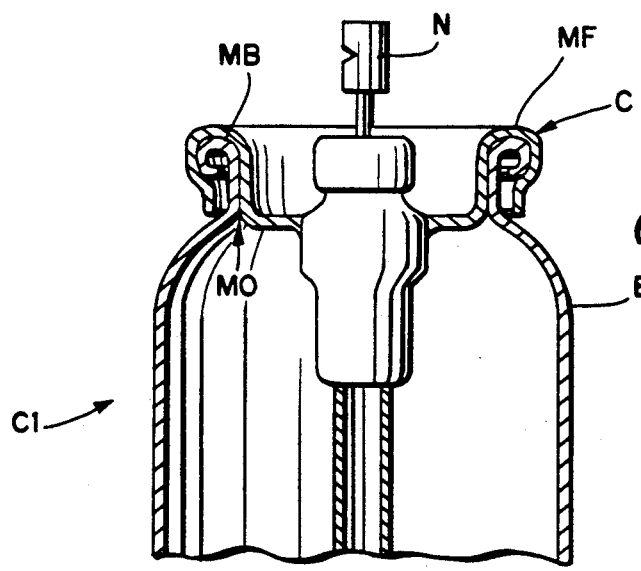
FIG. 1 is a schematic cross-sectional view of a prior art metallic container for aerosols.
Figure 2:
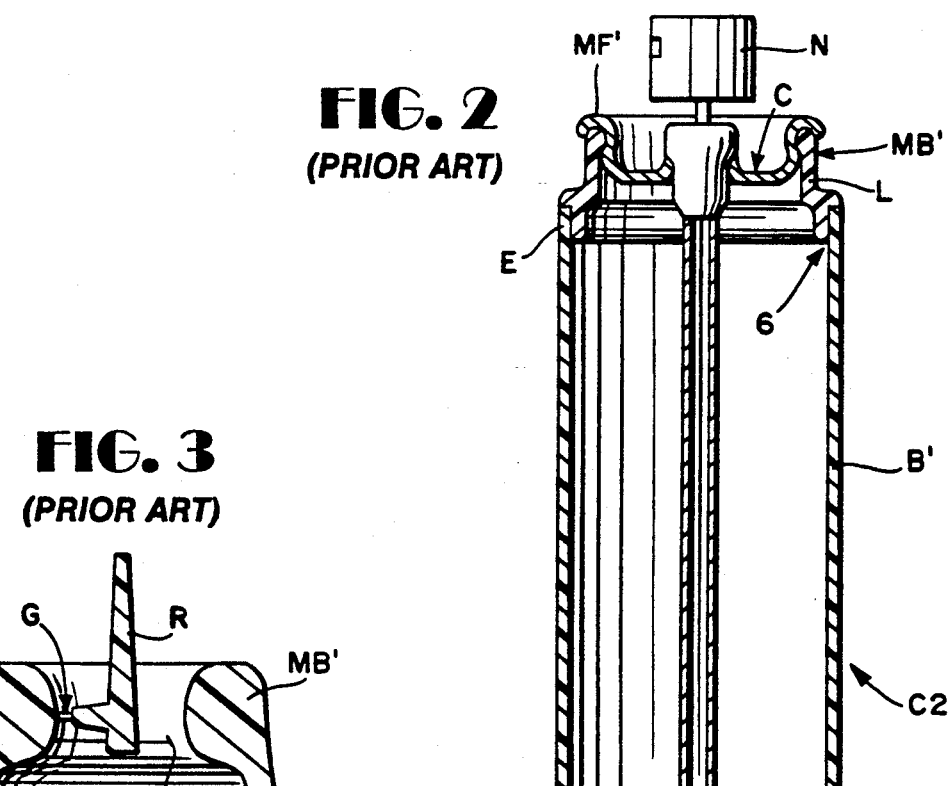
FIG. 2 is a cross-sectional view of a prior art resin container for aerosols.
Figure 3:
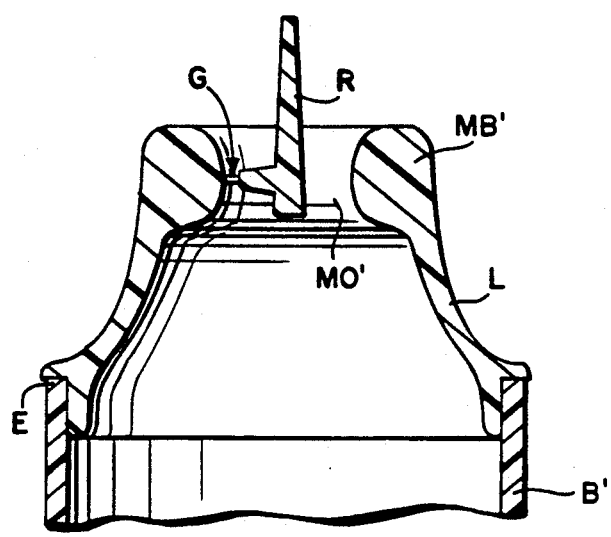
FIG. 3 is a schematically shows the injection molding of a resin lid used in connection with the prior art container shown in FIG. 2.
Figure 4:
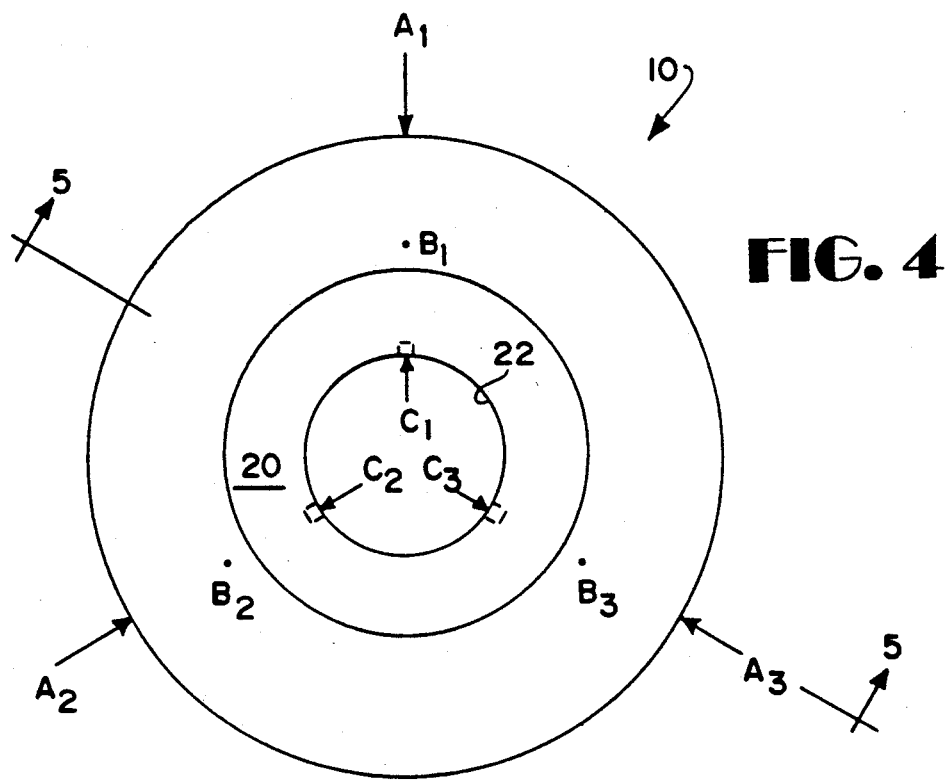
FIG. 4 is a plan view of a resin lid in accordance with the present invention showing the gate locations employed during the injection molding thereof.
Figure 5:
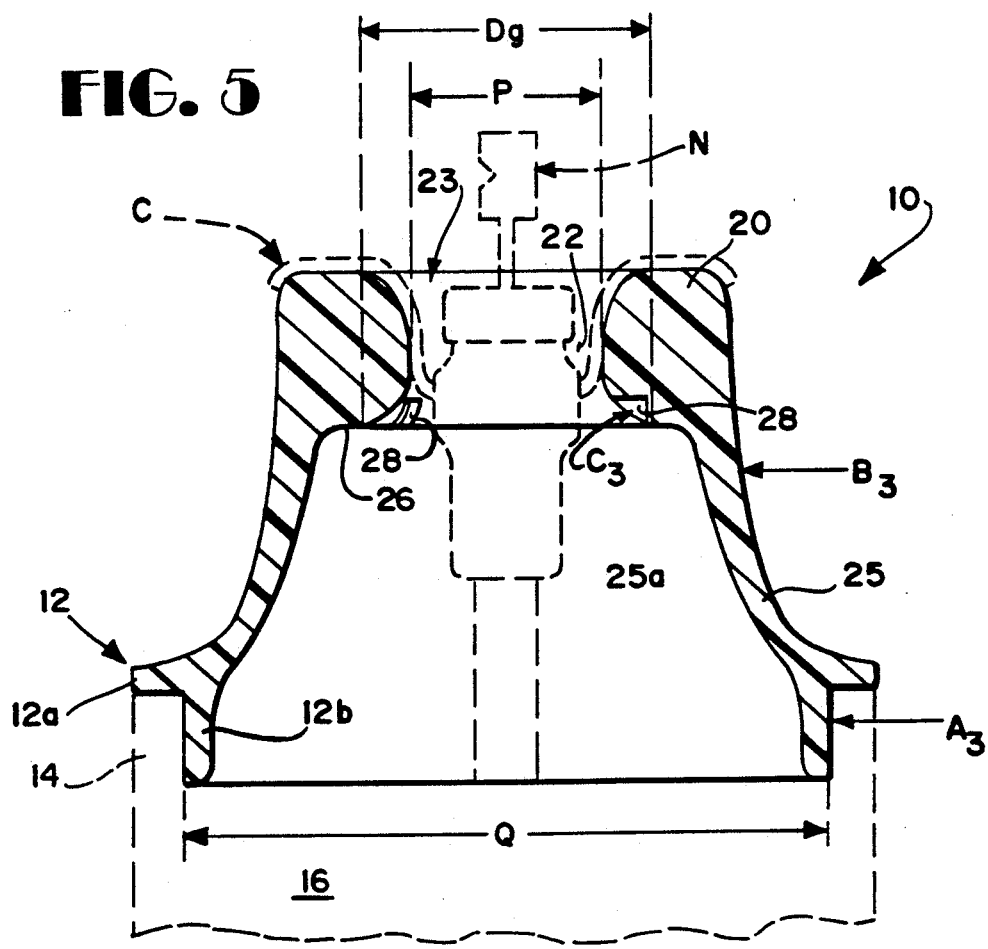
FIG. 5 is a cross-sectional view of the lid shown in FIG. 4 as taken along line 5—5 therein.

The injection molded lid 10 shown in FIGS. 4 and 5 is generally similar to the prior art lid L discussed above in connection with FIGS. 2 and 3. That is the lid 10 includes a base portion 12 having a horizontally disposed shoulder flange 12a and a vertically disposed mounting flange 12b that is radially inwardly offset relative to the flange 12a so as to define a space for accommodating the upper edge region 14 of container body 16. The container body 16 is preferably formed of a resin material so that the lid 10 can be rigidly coupled thereby via ultrasonic welding of shoulder flange 12b and/or flange 12a to the adjacent edge region 14 of container body 16. In such a manner, the lid 10 will form a fluid-tight seal with the edge region 14 of container 16 about the entire circumference of the base portion 12.

The upper terminal part of the lid 10 according to the present invention is formed of a circumferential mounting bead 20 having an annular generally convex interior surface 22 that establishes the diametrical dimension of the open mouth 23. The mounting bead 20 is joined to the base portion 12 of lid 10 by means of a generally conical throat section 25. More specifically, the interior surface 25a of the throat section 25 is integrally joined with the convex interior section 22 via an annular lower surface 26 that provides a smooth transition between the convex interior surface 22 of mounting bead 20 and the interior generally conical surface 25a associated with the throat section 25. It will be specifically observed that the annular lower surface 26 of mounting bead 20 is positioned radially laterally relative to the convex interior surface 22.

The number of injection molding gates employed during the injection molding of the lid 10 as described above is at least three. Moreover, these gates are equally circumferentially spaced-apart relative to one another. In this regard, it has been found that when less than three gates are used, the dimensional accuracy (roundness) of the mounting bead 20 results in lids that encounter difficulties in forming a fluid-tight seal between the mounting bead 20 and the dispensing cap and/or between the base 12 and the container body 16. Although improved dimensional accuracy (roundness) results when greater than three injection molding gates are employed, the costs associated with the injection mold as well as the strength and pressure resistance of the containers mitigate against the use of unusually large number of gates. Therefore, the number of gates employed should be at least three but no more than eight.

Accompanying FIGS. 4 and 5 schematically show possible gate locations when a plurality of injection molding gates are employed to form a lid 10. In this regard, three possible gate locations (designated A, B and C) each having three equally circumferentially spaced-apart gates are shown. Gate locations $A_1$-$A_3$ are obtained via a so-called peripheral side gate technique and are positioned on the exterior surface of the vertical flange 12b and thus in facing relationship to an interior surface region of the container body 16. As a result, gate locations $A_1$-$A_3$ are not included within the scope of the present invention as they may give rise to burrs requiring removal that could interfere with the fluid-tight seal between the lid 10 and the container body 16 at lid base 12.

Gate locations $B_1$-$B_3$ are obtained via a so-called pin point molding technique. As can be appreciated, while gate locations $B_1$-$B_3$ do not interfere with any of the fluid-tight seals—i.e., either between the dispensing cap and the mounting bead or between the base of the lid and the container body—they are nonetheless visibly perceptible on the exterior surface of the throat region 25. As a result, gate locations $B_1$-$B_3$ are outside the scope of this invention since the appearance of the lid is deleteriously affected.

Gate locations $C_1$-$C_3$ are, however, within the scope of the present invention. In this regard, it will be observed that gate locations $C_1$-$C_3$ are each positioned on the lower surface of mounting bead 20. More specifically, it will be observed especially from FIG. 5 that the convex interior surface of mounting bead 20 establishes a nominal diameter P of mouth opening 23. The gate locations $C_1$-$C_3$ are, however, located radially laterally relative to the convex surface 22. That is, the diameter of an imaginary cylinder coaxially positioned relative to mouth opening 23 and on which each of the gates $C_1$-$C_3$ are located will have a diameter $D_g$ that is greater than the nominal diameter P of the mouth opening 23.

In order to achieve this geometric relationship as between the gate locations $C_1$-$C_3$ and the mouth opening 23, the gates $C_1$-$C_3$ are preferably physically disposed within radial recessed slots 28 formed in the lower surface 26 of mounting bead 20 as shown in FIGS. 4 and 5. The radial recessed slots 28 will therefore "hide" from the dispensing cap structures any burrs that may remain after the gate residue is removed. As a result, the sealing fit between the dispensing cap and the mounting bead is not impaired.

A mold 30 that is used to injection mold the lid 10 described above is shown in accompanying FIGS. 6 and 7. In this regard, the mold cavities that are employed to form the lid structures described above are designated by a prime (') following the reference numeral. As is seen, the mold 30 includes a mounting bead cavity 20' which defines an inner surface 23' corresponding to the mouth opening 23. In this regard, it is preferred that the inner surface 23' be substantially perpendicular to the mold parting line 15.

Figure 6:
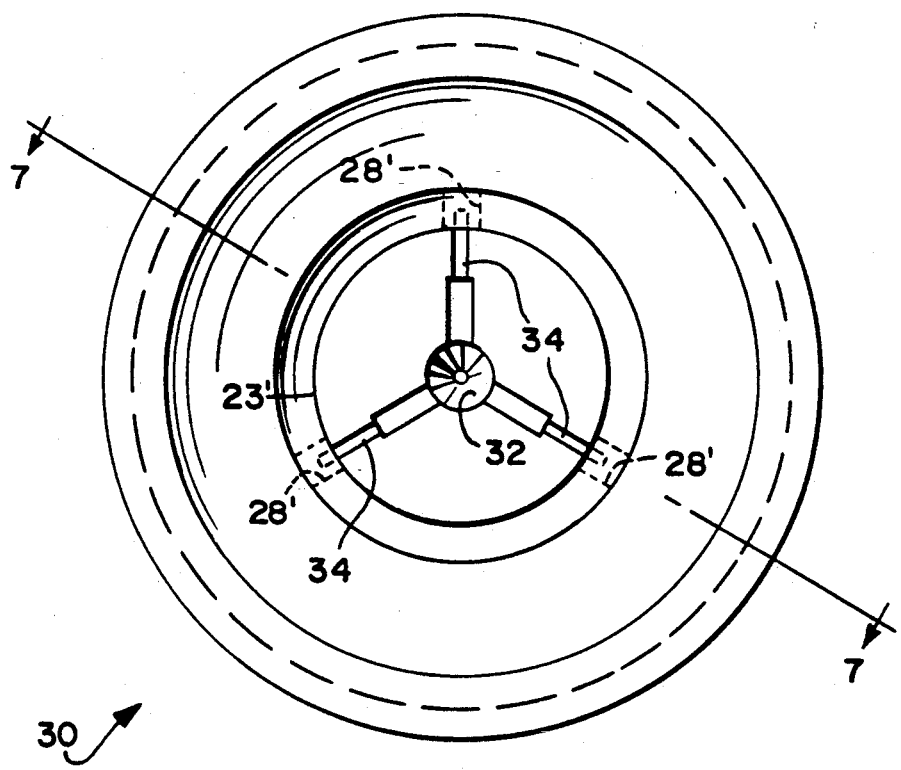
FIG. 6 is a plan view of the mold used to form the injection molded lid according to the present invention.
Figure 7:
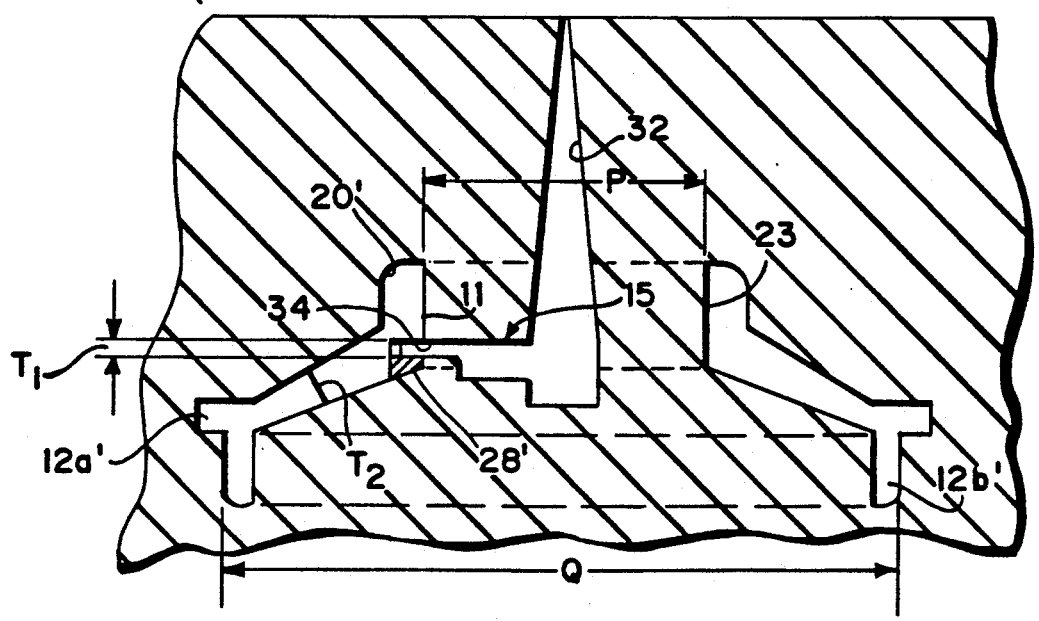
FIG. 7 is a cross-sectional view of the mold shown in FIG. 6 as taken along lines 7—7 therein.

It should be noted that the inner surface of the lid to be formed by the mold 30 will not be convex as described above with reference to FIGURES 4 and 5. Thus, the mold 30 shown in FIGS. 6 and 7 depicts an alternative to the convex interior surface described previously—i.e., a generally cylindrical surface. Notwithstanding this difference, the gate locations will be below and radially lateral to the inner surface of the mounting bead 20.

A central inlet 32 is provided so as to introduce molten thermoplastic material into the cavities of mold 30. To accomplish this, the inlet 32 includes a number of radially oriented runners 34 that are equally spaced apart relative to one another. The terminal end of the runners 34 (i.e., forming the gate locations $C_1$–$C_3$, respectively) are each physically located within a recessed surface 28'. Thus, upon injection of a thermoplastic resin into the cavities of the mold 30, the solidified resin remaining in the central inlet 32 and runners 34 will be removed. At the same time, the gates will be formed within radial slots 28 as described above. The thickness $T_1$ of the formed gate is preferably between about 50–60% of the average cross-sectional thickness $T_2$ of the lid 10.

Virtually any injection-moldable thermoplastic resin may be employed to form the lids according to the present invention. Particularly preferred resins include homopolymers and copolymers of polyethylene terephthalate, as well as homopolymers and copolymers of polyoxymethylene are preferred. Depending on the properties that are desired, the injection-moldable resin may include an inorganic filler material, such as a fibrous inorganic filler, e.g., glass fibers.

By providing an injection-molded lid for an aerosol container with at least three gates circumferentially equally spaced-apart from one another at the lower interior surface of the lid's mounting bead, the dimensional accuracy (roundness) of the lid can be improved. As a result, lids with reliable fluid-tight seals between the lid and the container body or the dispensing cap may be obtained. Furthermore, since the gates are located within radial slots, there is no need to physically remove the same. Thus, labor costs associated with the lids of the present invention are less as compared to the prior art resin containers.

EXAMPLES

The present invention will be further described in connection with the following non-limiting Examples.

In the Examples described below, the following test methods were employed:

1. Roundness Determination

The roundness of the injection-molded lids was estimated with a Talyrond ™ 200 roundness measuring device commercially available from Rank Taylor Hobson Co., Ltd. The results in accompanying Table 1 are reported on the basis of the average of 100 samples.

2. Fluid Leakage Evaluation 100 aerosol containers were examined. Each of the containers had a metallic dispensing cap that included an aerosol dispensing valve associated therewith and coupled to a container body. Each container had 50 g propellant charge (a mixture of Flon 12 with LPG) and was allowed to stand for thirty days in a heated furnace environment having a temperature of 45° C. At the conclusion of the thirty days, the number of containers having a reduced weight (indicative of propellant leakage) was counted. A hole was made in the containers identified as being of reduced weight, and 5 kg/cm$^2$ of air was blown into the container through the hole so as to elevate the internal pressure thereof. The air-pressurized containers were then held in water to detect leakage and to confirm that part of the container through which such leakage was occurring.

EXAMPLES 1 AND 2 AND COMPARATIVE EXAMPLE 1

Resin lids 10 as shown in FIGS. 4 and 5 for an aerosol container were produced by injection molding. The number of gates at the lower interior surface of the mounting bead of the lids was varied as noted in Table 1. The roundness of the inner diameter P of the mouth opening of the lid and the roundness of the outer diameter Q of base 12 to be ultrasonically welded to the container body were determined.

The resin used in these Examples was a polybutylene terephthalate resin containing 10% by weight of glass fibers. The molding conditions used included a resin temperature of 255° C., a mold temperature of 65° C., and a mold cycle of 20 seconds.

The molded lid was then welded at its base to a resin container body using ultrasonic welding techniques to form a resin container. The container was then charged with a propellant and leakage determinations were made. The results are shown in Table 1.

TABLE 1

|  | Number of gates (angle) | Thick mouth | | Ultrasonic-welded part | | Leakage test |
|---|---|---|---|---|---|---|
|  |  | inner diameter P (mm) | roundness (mμ) | outer diameter Q (mm) | roundness (mμ) |  |
| Example 1 | 3 (120) | 25.0 | 16 | 43.5 | 25 | 0/100 |
| Example 2 | 6 (60) | 25.0 | 21 | 43.5 | 35 | 0/100 |
| Comp. Ex. 1 | 1 — | 25.0 | 31 | 43.5 | 53 | 30/100 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aerosol container comprising:

a cylindrical container body having an open end;

a lid injection molded from a thermoplastic resin material and sealingly coupled to said container body and defining a mouth opening, and a metal dispensing cap sealingly coupled to said lid and closing said mouth opening, said dispensing cap including a dispensing nozzle for dispensing the contents of the container in aerosol form, wherein said lid includes;

a base portion sealingly coupled to said container body;

an upper annular mounting bead sealingly coupled to said dispensing cap and having an interior upper surface that establishes said mouth opening, and an interior lower surface that is interiorly lateral to said interior upper surface thereof; and a throat portion integrally joined to said base portion at a lower end thereof and to said interior lower surface of said mounting bead at an upper end thereof, wherein said lid includes at least three gates circumferentially equally spaced-apart relative to one another along said interior lower surface of said mounting bead.

2. An aerosol container as in claim 1, wherein said lid includes radial recessed slots formed in said interior lower surface of said mounting bead and corresponding in number to said gates, and wherein said gates are located within respective ones of said slots.

3. An aerosol container as in claim 1 or 2, wherein said container body consists essentially of a thermoplastic resin material, and wherein said base portion of said lid is ultrasonically welded to said container body.

4. An aerosol container as in claim 3, wherein the lid consists essentially of a thermoplastic resin selected from polybutylene terephthalate and polyacetal resins.

5. An injection-molded lid for aerosol containers having an annular mounting bead to which a metal dispensing cap is adapted to being attached, and wherein the mounting bead includes an upper interior surface that defines a throat opening, and a lower interior surface that is positioned radially outwardly relative to said upper interior surface, said lid further including at least three injection-molding gates circumferentially equally spaced-apart from one another and located at said lower interior surface.

6. A lid as in claim 5 which further includes radial recessed slots formed in said interior lower surface of said mounting bead and corresponding in number to said gates, and wherein said gates are located within respective ones of said slots.

7. A lid as in claim 5 or 6, which consists essentially of a thermoplastic resin selected from polybutylene terephthalate and polyacetal resins.

* * * * *

UNITED STATES PATENT AND TRADEMARK OFFICE
CERTIFICATE OF CORRECTION

PATENT NO. : 5,083,684

DATED : January 28, 1992

INVENTOR(S) : EBINA et al

It is certified that error appears in the above-identified patent and that said Letters Patent is hereby corrected as shown below:

Column 1, line 42, after "have" delete "be" and insert --been--;
line 51, after "techniques" delete "resulting in" and insert --thereby causing--;
line 58, after "represented" insert --by--.

Column 2, line 44, after "body," delete "ah" and insert --an--.

Column 3, line 24, after "that" delete "are" and insert --is-- and after "employed" delete "are" and insert --is--.

Signed and Sealed this

Twenty-seventh Day of April, 1993

Attest:

MICHAEL K. KIRK

*Attesting Officer*   Acting Commissioner of Patents and Trademarks